United States Patent
Chen et al.

(10) Patent No.: US 8,238,344 B1
(45) Date of Patent: Aug. 7, 2012

(54) MULTICAST LOAD BALANCING

(75) Inventors: Junan Chen, San Jose, CA (US); Yong Luo, Santa Clara, CA (US); James G. Washburn, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 789 days.

(21) Appl. No.: 11/694,521

(22) Filed: Mar. 30, 2007

(51) Int. Cl.
*H04L 12/28* (2006.01)
*H04L 12/56* (2006.01)

(52) U.S. Cl. .............. 370/395.32; 370/235; 370/389; 370/390; 370/395.31; 370/401

(58) Field of Classification Search .............. 370/401, 370/466, 13, 17, 46, 235, 389, 395.31, 395.32, 370/432, 536, 390
See application file for complete search history.

(56) References Cited

U.S. PATENT DOCUMENTS

| | | | |
|---|---|---|---|
| 5,467,345 A * | 11/1995 | Cutler et al. | 370/229 |
| 5,610,905 A * | 3/1997 | Murthy et al. | 370/401 |
| 5,959,989 A * | 9/1999 | Gleeson et al. | 370/390 |
| 6,185,210 B1 * | 2/2001 | Troxel | 370/395.32 |
| 6,553,028 B1 * | 4/2003 | Tang et al. | 370/389 |
| 6,594,261 B1 * | 7/2003 | Boura et al. | 370/389 |
| 2002/0012340 A1 * | 1/2002 | Kalkunte et al. | 370/360 |
| 2002/0016874 A1 * | 2/2002 | Watanuki et al. | 710/51 |
| 2005/0041665 A1 * | 2/2005 | Weyman et al. | 370/390 |
| 2005/0238018 A1 * | 10/2005 | Devi et al. | 370/389 |
| 2008/0151890 A1 * | 6/2008 | Zelig et al. | 370/390 |
| 2008/0291826 A1 * | 11/2008 | Licardie et al. | 370/230 |

* cited by examiner

*Primary Examiner* — Dang Ton
*Assistant Examiner* — Robert M Morlan
(74) *Attorney, Agent, or Firm* — Harrity & Harrity, LLP

(57) ABSTRACT

A method may include receiving a packet; identifying the packet as a multicast packet for sending to a plurality of destination nodes; selecting a first forwarding table or a second forwarding table for sending the packet to each of the plurality of destination nodes, wherein the first forwarding table includes first port information associated with a first destination and second port information associated with a second destination, and wherein the second forwarding table includes third port information associated with the second destination; sending the packet to the first destination using the first port; and sending the packet to the second destination using the second port when the first forwarding table is selected and sending the packet to the second destination using the third port when the second forwarding table is selected.

14 Claims, 8 Drawing Sheets

| DEST. ADDR. 502 | NEXT-HOP PORT 504 |
|---|---|
| 2.3.4.102 | PORT 352 |
| 2.3.4.104 | PORT 354 |
| 2.3.4.106 | PORT 356 |
| 2.3.4.108 | PORT 358, PORT 360 |
| ● ● ● | ● ● ● |

ROUTING TABLE 500

FIG. 5

MULTICAST LOAD BALANCING

BACKGROUND

In an increasingly networked world, digital networks are being used to deliver additional data services to end-users. End-users may receive video and audio streams over a network, such as a packet-based network. IPTV (Internet Protocol Television), for instance, is a system where a digital television signal may be delivered to subscribing consumers using the Internet Protocol (IP).

IPTV may be delivered using a multicasting technique. Multicast generally refers to the delivery of data to a group of destinations simultaneously. In multicasting, to conserve bandwidth, data may be transmitted once over each link of the network. Data may be replicated when the link to the destinations splits. In comparison with multicast, when "unicast" is used to deliver data to several recipients, multiple copies of the data may be sent over the same link, potentially wasting bandwidth. The bandwidth savings using multicasting may be significant.

Networks may use routers, switches, and other network devices for receiving and forwarding multicast data. Such a network device may receive a multicast packet through a port and may determine which port or ports to forward the packet. The network device may access a routing or forwarding table to determine on which port or ports it should forward a packet that it received.

SUMMARY

According to one aspect, a method may include receiving a packet; identifying the packet as a multicast packet for sending to a plurality of destination nodes; selecting a first forwarding table or a second forwarding table for sending the packet to each of the plurality of destination nodes, wherein the first forwarding table includes first port information associated with a first destination and second port information associated with a second destination, and wherein the second forwarding table includes third port information associated with the second destination; sending the packet to the first destination using the first port; and sending the packet to the second destination using the second port when the first forwarding table is selected and sending the packet to the second destination using the third port when the second forwarding table is selected.

According to another aspect, a network device may comprise a receiving port to receive a packet; a first port, a second port, and a third port for sending the packet; processing logic to identify the packet as a multicast packet for sending to a plurality of destination nodes; select a first forwarding table or a second forwarding table for sending the packet to each of the plurality of destination nodes, wherein the first forwarding table includes first port information associated with a first destination and second port information associated with a second destination, and wherein the second forwarding table includes third port information associated with the second destination; control sending the packet to the first destination using the first port; and control sending the packet to the second destination using the second port if the first forwarding table is selected or control sending the packet to the second destination using the third port if the second forwarding table is selected.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

FIG. 5 is an exemplary routing table;

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Exemplary Environment

Figure 1:
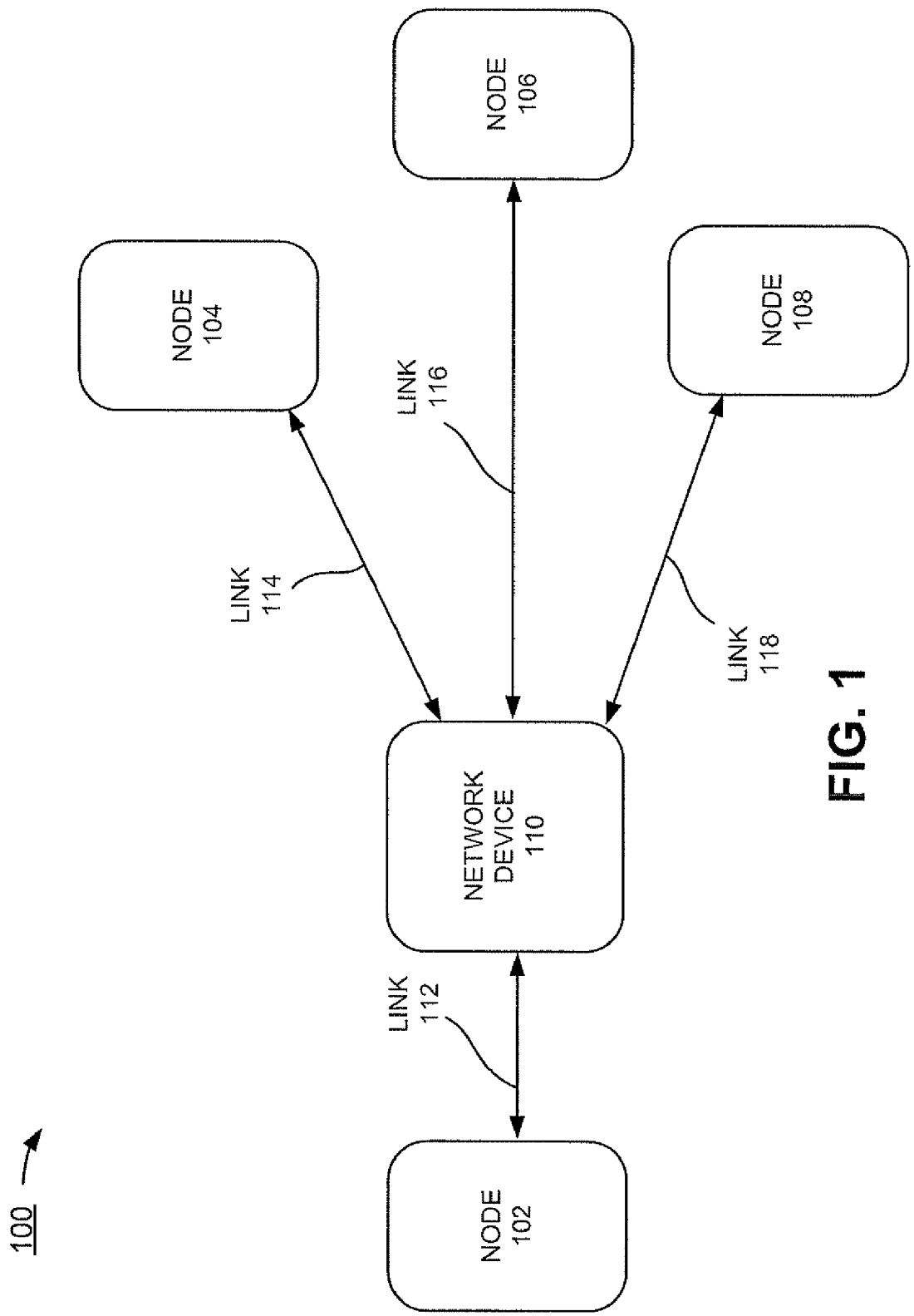
FIG. 1 is a block diagram of an exemplary environment that may include a network device for receiving and forwarding packets such as multicast packets.

FIG. 1 is a block diagram of an exemplary environment 100 that may include nodes 102, 104, 106, and 108, and a network device 110 for receiving and forwarding packets. In practice, there may be more, different, or fewer devices or a different arrangement of devices than what is shown in FIG. 1. For example, environment 100 may include thousands or even millions of nodes. Further, while FIG. 1 shows nodes 102-108 and network device 110 in environment 100, one or more of these devices may be remotely located, e.g., the devices may be geographically diverse. Although arrows in FIG. 1 may indicate communication directly between devices, communication may be indirect through one or more networks. Communication among user device 110 and nodes 102-108 may be accomplished via wired and/or wireless communication connections. Network device 110 may also be considered a "node."

Network device 110 may receive data from one node and may forward the data to one or more other nodes. For example, for a unicast, network device 110 may receive a packet from node 102 and may forward the packet to node 104. For a multicast, network device 110 may receive a packet from node 102 and may forward the packet to nodes 104, 106, and 108. Network device 110 may be a router, a switch, a packet forwarding engine, a firewall, or any other network device capable of receiving and forwarding packets.

Nodes 102-108 may include computers, telephones, personal digital assistants, or any other communication devices that may transmit or receive data. Nodes 102-108 may include, for example, computers that exchange data through network device 110. Nodes 102-108 may also include, for example, telephones that exchange voice conversations through network device 110. Network device 110 may communicate with nodes 102, 104, 106, and 108 over links 112, 114, 116, and 118, respectively.

Nodes

Figure 2:
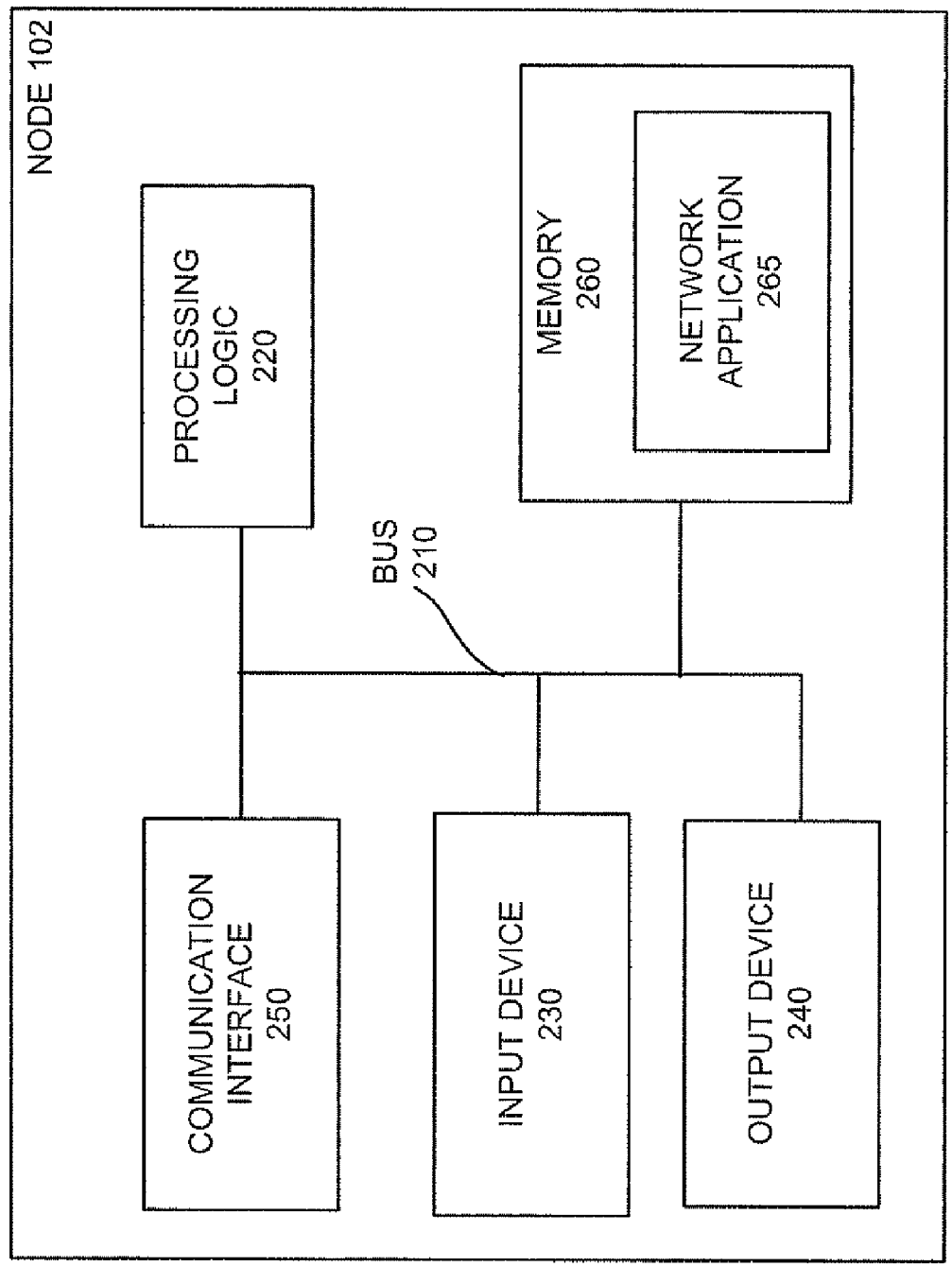
FIG. 2 is a block diagram of exemplary components of a node.

FIG. 2 is a block diagram of exemplary components of node 102. Nodes 104, 106, and 108 may be similarly configured. Node 102 may include a bus 210, processing logic 220, an input device 230, an output device 240, a communication interface 250, and a memory 260. Node 102 may include other or different components (not shown) that aid in receiving, transmitting, and/or processing data. Moreover, other configurations of components in node 102 are possible. Although components of node 102 are shown together, one or more components of node 102 may be remotely located.

Bus 210 may permit communication among the components of node 102. Processing logic 220 may include any type of processor or microprocessor that interprets and executes instructions. In other embodiments, processing logic 220 may include an application specific integrated circuit (ASIC), field programmable gate array (FPGA), or the like.

Input device 230 may include a device that permits a user to input information into node 102, such as a keyboard, a keypad, a mouse, a pen, a microphone, etc. Output device 240 may include a device that outputs information to the user, such as a display, a printer, or a speaker, etc.

Communication interface 250 may include any transceiver-like mechanism that enables node 102 to communicate with other devices and/or systems. For example, communication interface 250 may include mechanisms for communicating with node 104 via one or more networks.

Memory 260 may include a random access memory (RAM) or another type of dynamic storage device that stores information and instructions for execution by processing logic 220, a read only memory (ROM) or another type of static storage device that stores static information and instructions for processing logic 220, and/or some other type of magnetic or optical recording medium and its corresponding drive for storing information and/or instructions. Memory 260 may include a network application 265, for example, for communicating over a network.

Node 102 may establish a multicast or unicast communication session with nodes 104, 106, and/or 108, for example. A session may include a lasting connection between two or more nodes, for example. A session may include a stream or a flow of packets. Sessions may include telephone calls, multimedia distribution, or multimedia conferences. Node 102 may perform these and other acts in response to processing logic 220 executing software instructions contained in a computer-readable medium. A computer-readable medium may be defined as one or more tangible memory devices and/or carrier waves. The software instructions may be read into memory 260 from another computer-readable medium or from another device via communication interface 250.

Network Device

Figure 3:
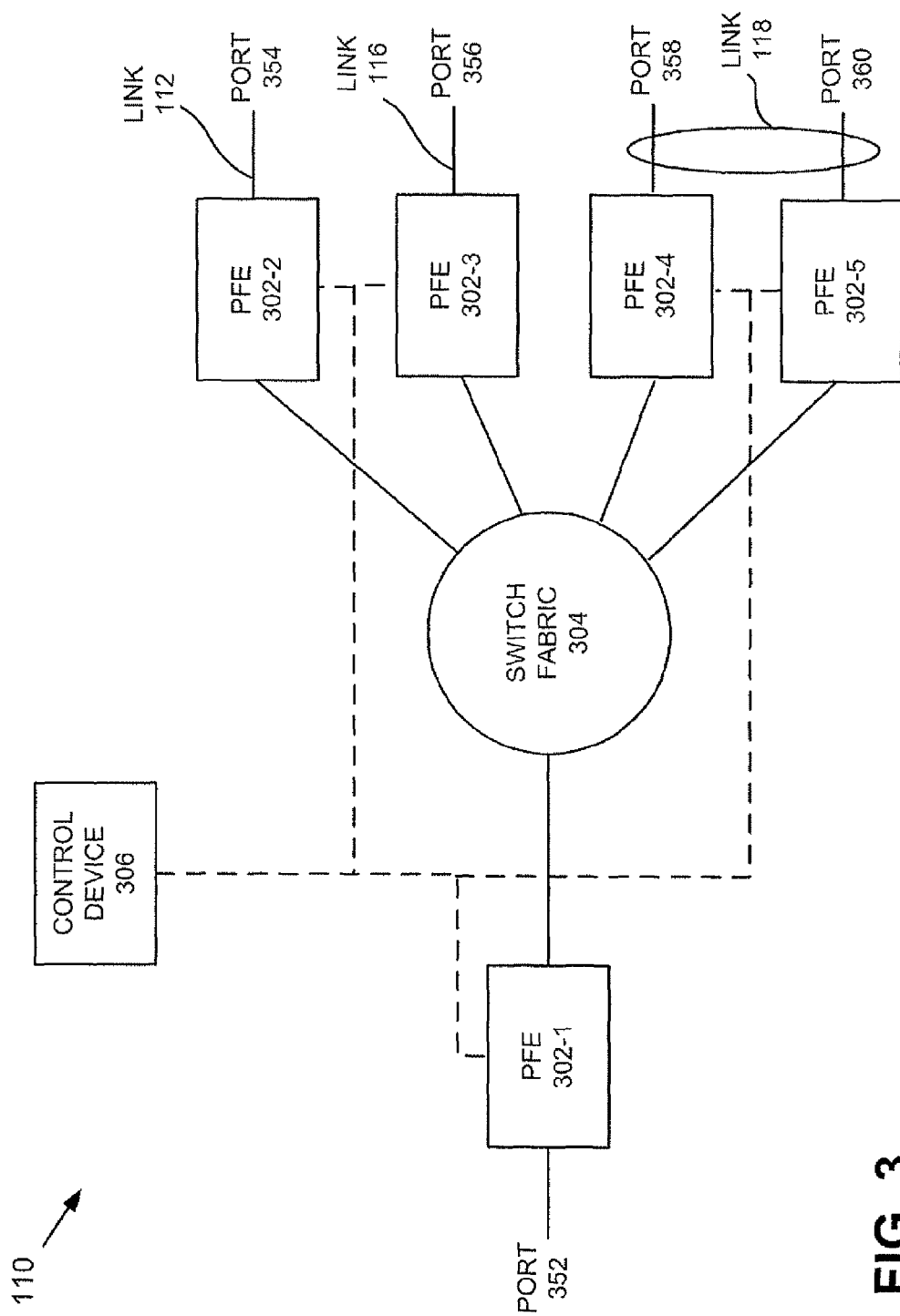
FIG. 3 is a block diagram of exemplary components of a network device.

FIG. 3 is a block diagram of exemplary components of network device 110. Network device 110 may include packet forwarding engines 302-1 through 302-5 (collectively "PFEs 302"), a switch fabric 304, and a control device 306. Network device 110 may include other or different components (not shown) that aid in receiving, transmitting, and/or processing data. For example, there may be more than or less than five PFEs. Moreover, other configurations of components in node 102 are possible. Although components of network device 110 are shown together, one or more components of network device may be remotely located.

Control device 306 may perform high level management functions for system 100. For example, control device 306 may communicate with other networks and/or systems connected to network device 110 to exchange information regarding network topology. Control device 306 may create routing tables, including multicast routing tables, based on network topology information, create forwarding tables based on the routing tables, and forward the forwarding tables to PFEs 302. PFEs 302 may use the forwarding tables to perform route lookups for incoming packets. Control device 306 may also perform other general control and monitoring functions for network device 110.

PFEs 302 may each connect to control device 306 and switch fabric 304. Connections between PFEs 302 and control device 306 are indicated by dashed lines. PFEs 302 may receive packet data on physical ports connected to a network, such as a wide area network (WAN), a local area network (LAN), or another type of network. Each physical port could be one of many types of transport media, such as optical fiber or Ethernet cable. Data on the physical port may be formatted according to one of several protocols, such as the synchronous optical network (SONET) standard, an asynchronous transfer mode (ATM) technology, or Ethernet. The data may take the form of data units, where each data unit may include all or a portion of a packet.

A PFE 302-$x$ (where PFE 302-$x$ refers to one of PFEs 110) may process incoming data units prior to transmitting the data units to another PFE or the network. To facilitate this processing, PFE 302-$x$ may reassemble the data units into a packet and perform a route lookup for the packet using a forwarding table to determine destination information. If the destination information indicates that the packet should be sent out on a physical port connected to PFE 302-$x$, then PFE 302-$x$ may prepare the packet for transmission by, for example, segmenting the packet into data units, adding any necessary headers, and transmitting the data units through physical port. If the destination information indicates that the packet should be sent out on a physical port not connected to PFE 302-$x$, then PFE 302-$x$ may transfer the packet or data units to another PFE 302-$x$ through switch fabric 304.

Packet Forwarding Engine

Figure 4:
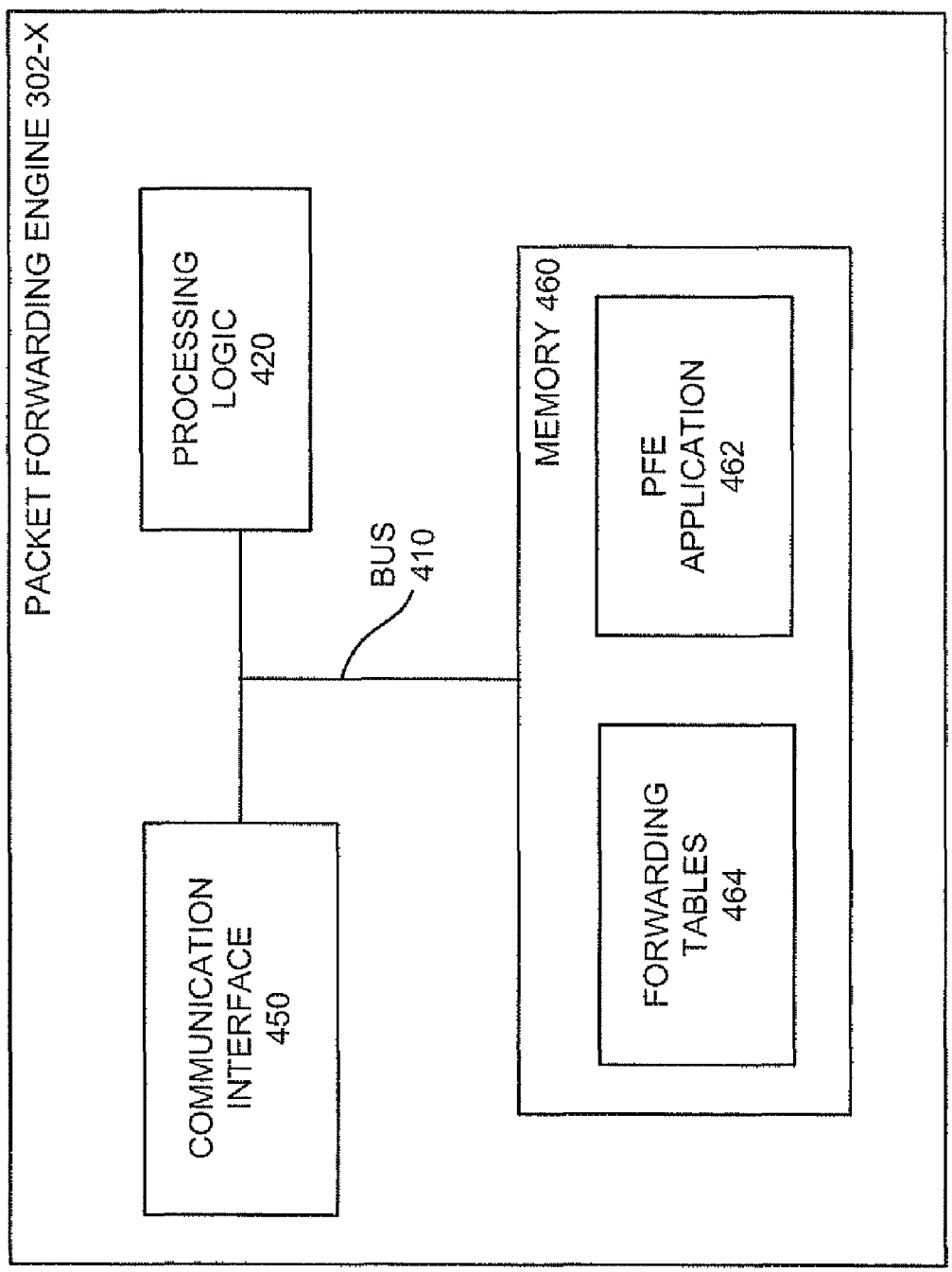
FIG. 4 is a block diagram of exemplary components of a packet forwarding engine.

FIG. 4 is a block diagram illustrating exemplary components of a PFE 302-$x$. PFE 302-$x$ may include a bus 410, processing logic 420, a communication interface 450, and a memory 460. PFE 302-$x$ may include other or different components (not shown) that aid in receiving, transmitting, and/or processing data. Moreover, other configurations of components in PFE 302-$x$ are possible. Although components of PFE 302-$x$ are shown together, one or more components of PFE 302-$x$ may be remotely located.

Bus 410 may permit communication among the components of PFE 302-$x$. Processing logic 420 may perform routing functions and handle packet transfers to and from a port and switch fabric 304. For each packet that PFE 302-$x$ handles, processing logic 420 may perform a route-lookup function and may perform other processing-related functions. Processing logic 420 may include any type of processor or microprocessor that interprets and executes instructions. In other embodiments, processing logic 420 may include an ASIC, FPGA, or the like.

Communication interface 450 may include any transceiver-like mechanism that enables PFE 302-$x$ to communicate with other devices, systems, or components of network device 110. For example, communication interface 450 may include mechanisms for communicating with switch fabric 304 or nodes 102, 104, 106, and 108 via one or more networks.

Memory 460 may include a RAM or another type of dynamic storage device that stores information and instructions for execution by processing logic 420, a ROM or another type of static storage device that stores static information and instructions for processing logic 420, and/or some other type of magnetic or optical recording medium and its corresponding drive for storing information and/or instructions.

Memory 460 may include a PFE application 462 and forwarding tables 464. PFE application 462 may include instructions to assist PFE 302-x in forwarding packets. Forwarding tables 464 may store information that allows PFE application 364 to determine which port or ports network device 110 may use to forward a packet. PFE application 462 may include instructions to maintain information stored in forwarding tables 464. PFE application 462 may also include instructions to access forwarding tables 464 when forwarding packets. Software instructions, such as network application 462, contained in a computer-readable medium may be executed by processing logic 420 to cause network device 110 to perform these and other acts. The software instructions may be read into memory 460 from another computer-readable medium or from another device via communication interface 450.

Routing Table

FIG. 5 is an exemplary routing table 500. Forwarding tables 464 may include routing table 500. Routing table 500 may also be stored in a memory (not shown) of control device 306. Routing table 500 may include a destination address field 502 and a next-hop port field 504. Routing table 500 may include additional, different, or fewer fields than illustrated in FIG. 5. For example, routing table 500 may include a field (not shown) for a source address.

Destination address field 502 may identify destination network addresses of packets that may be received by network device 110. In exemplary routing table 500, network device 110 may receive packets that may be destined for network address 2.3.4.102, 2.3.4.104, 2.3.4.106, and 2.3.4.108, which may correspond to nodes 102, 104, 106, and 108, respectively. Next-hop port field 504 may include information related to the port that may be used to forward a packet to the destination address in corresponding destination address field 502.

In exemplary routing table 500, port 352 corresponds to destination address 2.3.4.102, e.g., node 102; port 354 corresponds to destination address 2.3.4.104, e.g., node 104; port 356 corresponds to destination address 2.3.4.108, e.g., node 108; and port 360 may also correspond to destination address 2.3.4.108, e.g., node 108. In this exemplary embodiment, node 108 may have more than one next-hop port, e.g., port 358 and port 360.

Ports 358 and 360 may be considered an "aggregate interface" for node 108. An aggregate interface is a communication link that may include more than one physical port. A communication link that includes an aggregate interface may result in a link bandwidth that is greater than the bandwidth that either port of the aggregate interface may provide. Thus, port 358 and port 360 may form communication link 118. As such, link 118 may have a greater bandwidth than either port 358 or port 360 could provide alone. In order to take advantage of the bandwidth of link 118, therefore, packets sent to node 108 may be shared or balanced among port 358 and 360, for example. Although link 118 is an aggregate of two ports, an aggregate interface may include more than two ports.

In addition to link 118, port 352 may correspond to link 112, port 354 may correspond to link 114, port 356 may correspond to link 116.

Multicast Forwarding Tables

Figure 6:
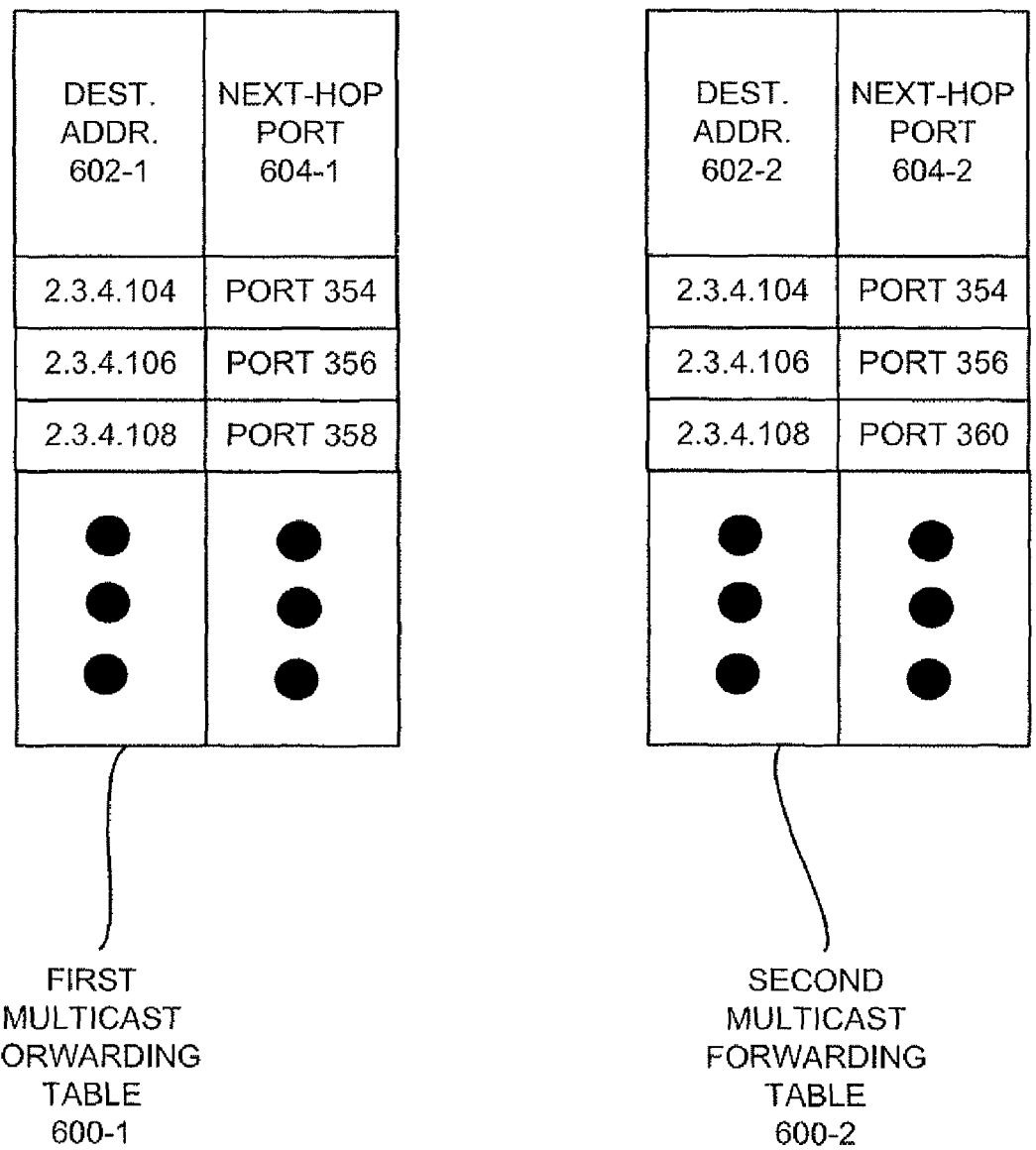
FIG. 6 is an exemplary forwarding table for a multicast packet.

FIG. 6 depicts exemplary multicast routing tables, e.g., first multicast forwarding table 600-1 and second multicast forwarding table 600-2 (collectively "multicast forwarding tables 600"). Forwarding tables 464 of FIG. 4 may include multicast forwarding tables 600. Multicast forwarding tables 600 may also be stored in a memory (not shown) of control device 306. Multicast forwarding table 600-1 may include a destination address field 602-1 and a next-hop port field 604-1. Routing table 600-2 may be similarly configured. Although FIG. 6 shows two multicast forwarding tables, any number are possible. Multicast forwarding tables 600 may include additional, different, or fewer fields than illustrated in FIG. 6.

In the exemplary embodiment of forwarding table 600-1, port 354 corresponds to destination address 2.3.4.104, e.g., node 104, consistent with routing table 500; and port 356 corresponds to destination address 2.3.4.106, e.g., node 106, consistent with routing table 500. Further, according to forwarding table 600-1, port 358—one of the ports in the aggregate interface forming link 118—corresponds to destination address 2.3.4.108, e.g., node 108, consistent with routing table 500. In one embodiment, forwarding table 600-1 may not list port 360—the other one of the ports in the aggregate interface forming link 118—corresponding to destination address 2.3.4.108. As such, forwarding table 600-1 may describe a multicast of a packet to nodes 104, 106, and 108 (over port 358).

In the exemplary embodiment of forwarding table 600-2, port 354 corresponds to destination address 2.3.4.104, e.g., node 104, consistent with routing table 500; and port 356 corresponds to destination address 2.3.4.106, e.g., node 106, consistent with routing table 500. Further, according to forwarding table 600-2, port 360—one of the ports in the aggregate interface forming link 118—corresponds to destination address 2.3.4.108, e.g., node 108, consistent with routing table 500. In one embodiment, forwarding table 600-2 may not list port 358—the other one of the ports in the aggregate interface forming link 118—corresponding to destination address 2.3.4.108. As such, forwarding table 600-1 may describe a multicast of a packet to nodes 104, 106, and 108 (over port 360).

As shown in multicast forwarding tables 600, the information in one (table 600-1, for example) may be the same as the other (table 600-2, for example), but for the destinations that employ an aggregate interface. In the case where a destination employs an aggregate interface, each multicast routing table may include one of aggregated interfaces, e.g., one of the plurality of ports. In one embodiment, each multicast routing table includes a different one of the aggregated interfaces, e.g., a different one of the plurality of ports.

Multicast forwarding table 600-1 may be associated with one flow of packets and multicast forwarding table 600-2 may be associated with another flow of packets. For example, multicast forwarding tables 600 may each define the destination addresses and associated ports for the broadcast of two IPTV programs.

Network device 110 and PFEs 302 may store other routing tables associated with other sessions with different destination nodes. For example, while multicast forwarding tables 600 may define the destination nodes and associated ports for the broadcast of a particular IPTV program, another set of routing tables (not shown) may define the destination nodes and associated ports for the broadcast of a different IPTV program.

The number of multicast routing tables may correspond to the number of aggregated ports for one of the destinations. For example, if node 108 (link 118) aggregated three ports, then multicast forwarding tables 600 may include three tables. If in addition to the three aggregated ports for node 108, node 106 (link 116) aggregated two ports, then multicast forwarding tables 600 may still include three tables to accommodate the three aggregated ports for node 108 (link 118). In this embodiment, the three multicast forwarding tables 600 may repeat a port number for aggregated interface forming link 116 to node 106. Alternatively, the number of forwarding tables 600 may correspond to the least common multiple of the number of aggregated ports for different destinations in a multicast. For example, if node 106 (link 116) aggregated two ports and node 108 (link 118) aggregated three ports, then the number of multicast tables may be six—the least common multiple of two and three.

Exemplary Processing

Figure 7:
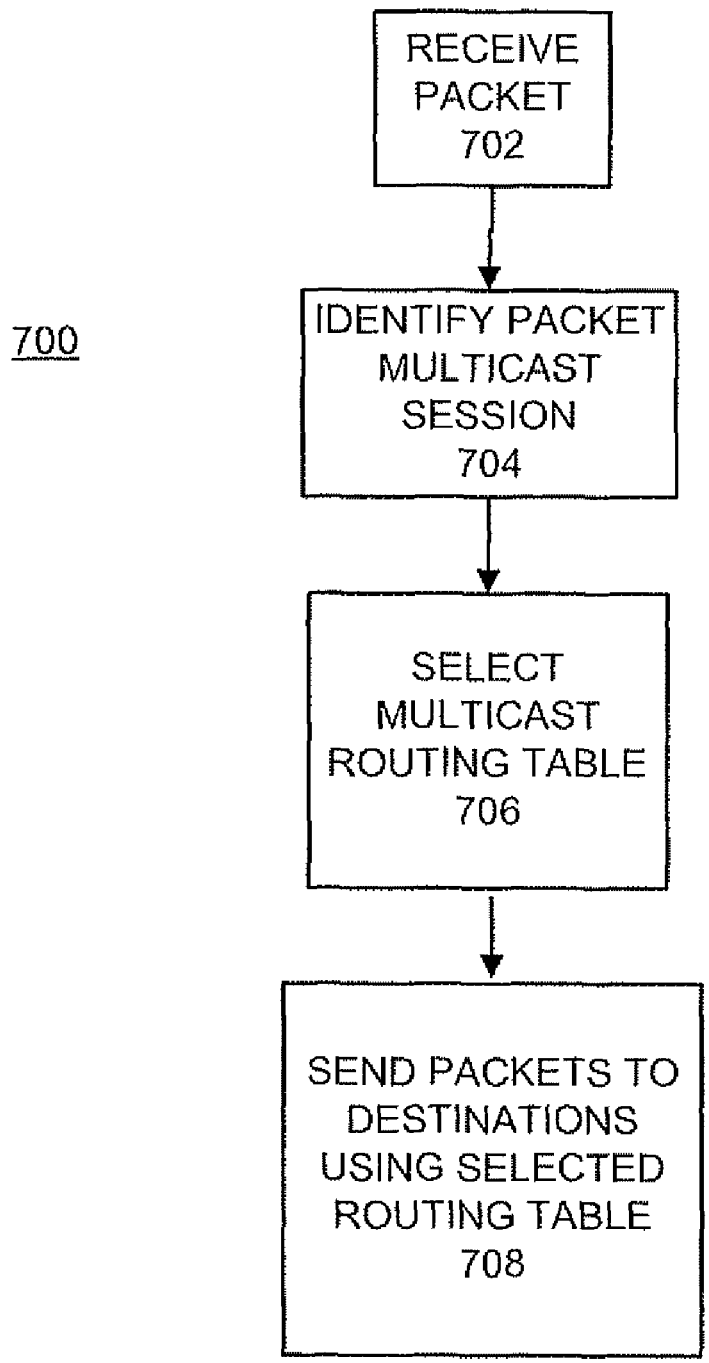
FIG. 7 is a flowchart of a process for forwarding a multicast packet to destination addresses.

FIG. 7 is a flowchart of a process 700 for forwarding a packet to destination addresses for a multicast. Process 700 may begin when a packet is received (block 702). A packet may be received in network device 110, for example. The packet may be identified as a multicast packet belonging to a particular session or flow (block 704). The packet may be identified as a multicast packet belonging to a particular session by information contained in the packet such as in the header of the packet. Alternatively, the packet may be identified as a multicast packet belonging to a particular session by a hash of its destination address, source address, and/or other protocol information. A multicast forwarding table may be selected (block 706) from a plurality of multicast forwarding tables associated with the multicast session.

The multicast forwarding table may be selected randomly or may be selected in a round-robin fashion, for example. In one embodiment, the same multicast forwarding table is selected for the same flow of packets or for the same session, for example. In this embodiment, the same multicast forwarding table may be selected to help ensure that packets do not arrive at a destination out of order. In another embodiment, a different multicast forwarding table may be selected for different flows of packets or for different sessions. In this embodiment, different flows and/or sessions may be distributed over different ports, for example. In one embodiment, the packet flow may be determined based on (1) the destination address of the received packet and/or (2) the source address of the received packet. In another embodiment, the packet flow signature may be based on (1) the source and destination address of the received packet, (2) the communication port that received the packet, (3) layer-four protocol information about the received packet, such as the PCP source port, and/or (4) other protocol information, such as the source and/or destination port number and protocol type. The multicast forwarding table may be accessed and the received packet may be sent to the destinations on the appropriate ports in accordance with the selected forwarding table (block 708).

Figure 8:
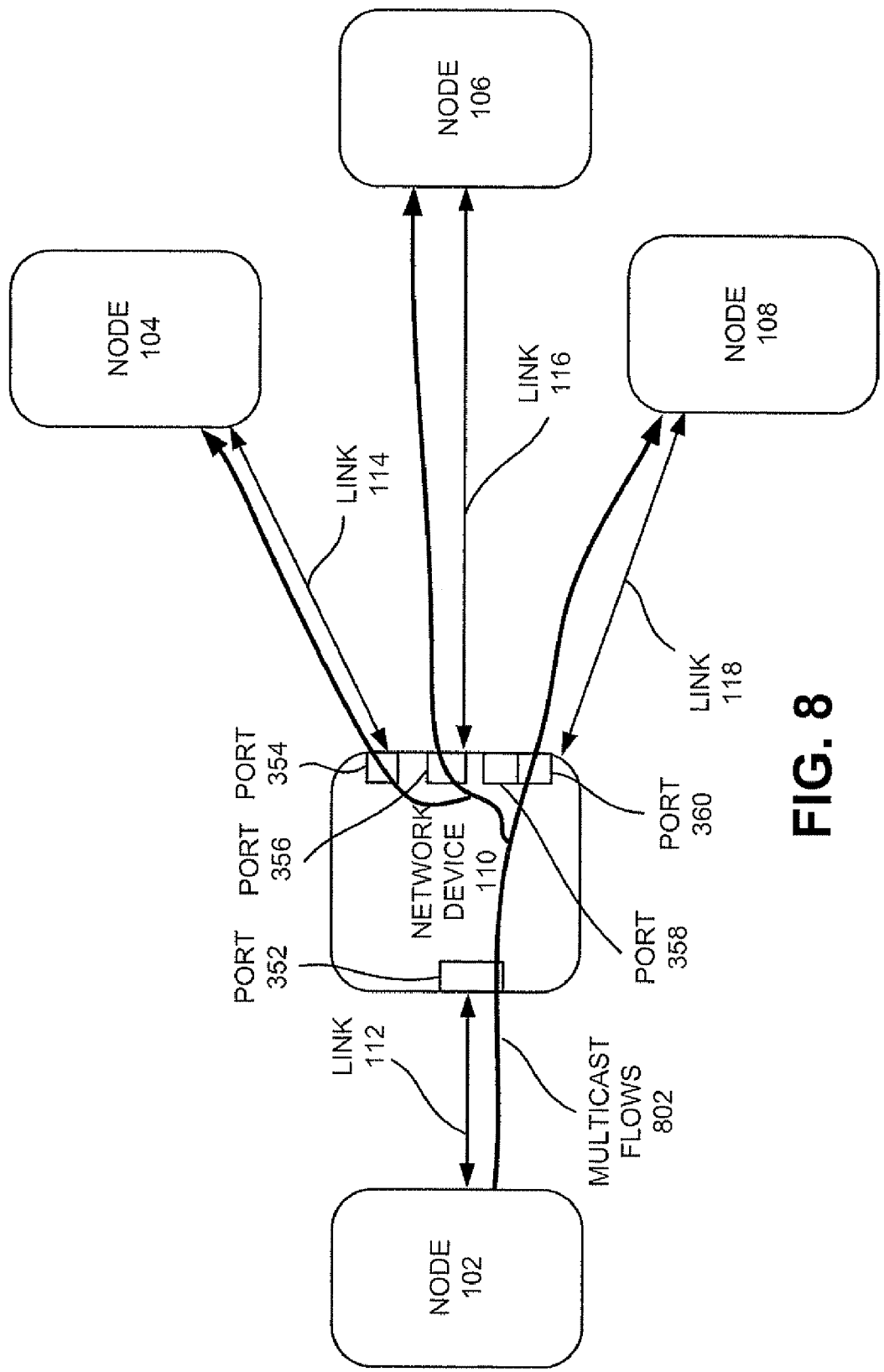
FIG. 8 is a block diagram of an exemplary flow of multicast packets.

For example, node 102 may transmit a packet to network device 110 for a multicast. Such a packet may be part of a flow of packets form node 102 to network device 110 for a multicast session defined by multicast forwarding table 600-2. FIG. 8 is a block diagram of exemplary multicast flow 802 from node 102 in environment 100. Network device 110 may receive the packets in multicast flow 802 and may identify the packet as belonging to a multicast or flow, such as the multicast session or flow defined by forwarding table 600-2.

Network device 110 may select a multicast forwarding table. In this example, network device 100 may select forwarding table 600-2. Network device 110 may then copy and transmit the packet to the destinations listed in the selected multicast forwarding table, e.g., forwarding table 600-2. Therefore, network device 110 may send the packet to node 104 through port 354 (as shown in forwarding table 600-2) over link 114 (as depicted in FIG. 8). Network device 110 may send the packet to node 106 through port 356 (as shown in forwarding table 600-2) over link 116 (as depicted in FIG. 8). Network device 110 may send the packet to node 108 through port 360 (as shown in forwarding table 600-2) over link 118 (as depicted in FIG. 8).

Network device 110 may select forwarding table 600-1 instead of forwarding table 600-2 if, for example, network device 110 determined that a packet belonged to a different flow of packets. If network device 110 selected forwarding table 600-1 instead of forwarding table 600-2, then network device 110 may have sent the packet to node 108 through port 358 (as shown in forwarding table 600-1) over link 118 (as depicted in FIG. 8). Thus, network device 110 may share the load of a multicast flow, such as multicast flow 802 over port 358 and port 360 to node 108 over link 118.

In one embodiment, network device 110 may select the same multicast forwarding table for packets belonging to the same flow of packets and/or multicast session of packets. In this embodiment, packets belonging to the same flow of packets may be forwarded to destinations on the same ports, which may prevent packets from arriving at destinations out of order. In one embodiment, network device 110 may select different forwarding tables for a different flow of packets and/or session. In this embodiment, network device 110 may distribute flows and/or sessions across multiple ports.

CONCLUSION

Implementations described herein may allow a network device to multicast a packet to a plurality of destinations. Implementations described herein may allow a network device to multicast a flow of packets to a plurality of destinations while balancing the load over an aggregated interface.

The descriptions of exemplary components above, including components shown in FIGS. 2, 3, and 4 include a discussion of software instructions contained in computer-readable media. Alternatively, in each of these implementations, hardwired circuitry may be used in place of or in combination with software instructions to implement processes described herein. Thus, implementations described herein are not limited to any specific combination of hardware circuitry and software.

It will also be apparent that aspects, as described above, may be implemented in many different forms of software, firmware, and hardware in the implementations illustrated in the figures. The actual software code or specialized control hardware used to implement these aspects is not limiting of the present invention. Thus, the operation and behavior of the aspects were described without reference to the specific software code—it being understood that software or control hardware could be designed to implement the aspects based on the description herein.

Further, although the processes described above, including process 700, may indicate a certain order of blocks, the blocks in these figures may be performed in any order.

In addition, implementations described herein may use the internet-protocol (IP), asynchronous transfer mode (ATM) protocol, or any other type of network protocol. As such, implementations described herein may use IP addresses, ATM addresses, or any other type of network addresses. Implementations may be described in terms of packets, implementations could use any form of data (packet or non-packet).

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
   receiving, at a network device, a first packet and a second packet,
   the first packet and the second packet to be multicast to a plurality of destination nodes that include a first destination and a second destination, the first destination being associated with a first port of the network device, and the second destination being associated with an aggregated interface that includes:
   a second port, of the network device, that differs from the first port, and
   a third port, of the network device, that differs from the first port and the second port;
   multicasting, by the network device, the first packet to the plurality of destination nodes using a first multicast forwarding table, the first multicast forwarding table including routing information associated with the first port and the second port not including routing information associated with the third port;
   multicasting, by the network device, the second packet to the plurality of destination nodes using a second multicast forwarding table, the second multicast forwarding table including routing information associated with the first port and the third port and not including routing information associated with the second port;
   receiving a third packet to be multicast to the plurality of destination nodes; and
   multicasting the third packet using a randomly selected one of the first multicast forwarding table or the second multicast forwarding table.

2. The method of claim 1, where the first packet is associated with a first flow and the second packet is associated with a second flow,
   where the first multicast forwarding table is associated with the first flow and the second multicast forwarding table is associated with the second flow, and
   where the first flow is different from the second flow.

3. The method of claim 2, where the first packet is included in a plurality of first packets associated with the first flow, and where the second packet is included in a plurality of second packets associated with the second flow, and
   where the method further comprises:
   receiving the plurality of first packets associated with the first flow;
   selecting the first multicast forwarding table to multicast each of the plurality of first packets associated with the first flow;
   receiving the plurality of second packets associated with the second flow; and
   selecting the second multicast forwarding table to multicast each of the plurality of packets associated with the second flow.

4. A device comprising:
   a receiving port to receive a first packet, a second packet, and third packet;
   a first port, a second port, and a third port to multicast the first packet, the second packet, and the third packet to a plurality of destination nodes that include a first destination and a second destination, the first destination being associated with the first port, and the second destination being associated with an aggregated interface that includes the second port and the third port; and
   processing logic to
   multicast, using a first multicast forwarding table, the first packet to each of the plurality of destination nodes, the first multicast forwarding table including routing information associated with the first port and the second port and not including routing information associated with the third port,
   multicast the second packet to the plurality of destination nodes using a second multicast forwarding table, the second multicast forwarding table including routing information associated with the first port and the third port and not including routing information associated with the second port, and
   multicast the third packet based on a randomly selected one of the first multicast forwarding table or the second multicast forwarding table.

5. The device of claim 4, where the first packet is associated with a first flow and the second packet is associated with a second flow,
   where the first multicast forwarding table is associated with the first flow and the second multicast forwarding table is associated with the second flow, and
   where the first flow is different from the second flow.

6. The device of claim 5, where the first packet is included in a plurality of first packets associated with the first flow, and where the second packet is included in a plurality of second packets associated with the second flow,
   where the receiving port is further to receive the plurality of first packets associated with the first flow and the plurality of second packets associated with the second flow, and
   where the processing logic is further to:
   select the first multicast forwarding table to multicast each of the plurality of first packets associated with the first flow, and
   select the second multicast forwarding table to multicast each of the plurality of second packets associated with the second flow.

7. An apparatus comprising:
   a receiving unit to receive a first flow of packets, second flow of packets, and a third flow of packets,
   the first flow of packets, the second flow of packets, and the third flow of packets to be multicast to a plurality of destination nodes that include a first destination and a second destination, the first destination being associated with a first port, and the second destination node being associated with an aggregated interface that includes:
   a second port that differs from the first port, and
   a third port that differs from the first port and the second port;
   a first multicasting unit to multicast the first flow of packets using a first multicast forwarding table that includes routing information about the first port and routing information associated with the second port;
   a second multicasting unit to multicast the second flow of packets using a second multicast forwarding table that differs from the first multicast forwarding table and that includes routing information associated with the first port and the third port; and
   a third multicasting unit to multicast the third flow of packets using a randomly selected one of the first multicast forwarding table or the second multicast forwarding table.

8. The apparatus of claim 7, where the first multicast forwarding table and the second multicast forwarding table are associated with a multicast session in which the first flow packets and the second flow or packets are received.

9. The method of claim 1, where the aggregated interface, associated with the second destination, further includes a fourth port, of the network device, that differs from the first port, the second port, and the third port,
- where the first multicast forwarding table and the second multicast forwarding table do not include routing information associated with the fourth port, and
- where the method further comprises:
  - receiving a fourth packet; and
  - multicasting the fourth packet to the plurality of destination nodes using a third multicast forwarding table that includes routing information associated with the first port and the fourth port and does not include routing information associated with the second port and the third port.

10. The device of claim 4, where the receiving port is further to receive a fourth packet to be multicast to the plurality of destination nodes, and
- where the aggregated interface, associated with the second destination, further includes a fourth port, of the device, that differs from the first port, the second port, and the third port,
- where the first multicast forwarding table and the second multicast forwarding table do not include routing information associated with the fourth port, and
- where the processing logic is further to:
  - multicast the fourth packet to the plurality of destination nodes using a third multicast forwarding table that includes routing information associated with the first port and the fourth port and does not include routing information associated with the second port and the third port.

11. A memory device to store instructions, the instructions comprising:
- one or more instruction which, when executed by a device, cause the device to receive a first packet, a second packet, and a third packet,
- the first packet, the second packet, and the third packet to be multicast to a plurality of destination nodes that include a first destination and a second destination, the first destination being associated with a first port of the device, and the second destination being associated with an aggregated interface that includes:
  - a second port of the device that differs from the first port, and
  - a third port of the device that differs from the first port and the second port;
- one or more instruction which, when executed by the device, cause the device to multicast the first packet to the plurality of destination nodes using a first multicast forwarding table that includes routing information associated with the first port and the second port and does not include routing information associated with the third port;
- one or more instruction which, when executed by the device, cause the device to multicast the second packet to the plurality of destination nodes using a second multicast forwarding table, that includes routing information associated with the first port and the third port and does not include routing information associated with the second port; and
- one or more instruction to select, in a round-robin fashion, one of the first multicast forwarding table or the second multicast forwarding table to use to multicast the third packet.

12. The memory device of claim 11, where the first packet is associated with a first flow and the second packet is associated with a second flow, and
- where the first multicast forwarding table is associated with the first flow and the second multicast forwarding table is associated with the second flow, the first flow being different from the second flow.

13. The memory device of claim 12, where the first packet is included in a plurality of first packets associated with the first flow, and where the second packet is included in a plurality of second packets associated with the second flow, and
- where the instructions further comprise:
  - one or more instruction to receive the plurality of first packets associated with the first flow;
  - one or more instruction to select the first multicast forwarding table for each of the plurality of first packets associated with the first flow;
  - one or more instruction to receive the plurality of second packets associated with the second flow; and
  - one or more instruction to select the second multicast forwarding table for each of the plurality of packets associated with the second flow.

14. The memory device of claim 11, where the aggregated interface, associated with the second destination, further includes a fourth port, of the device, that differs from the first port, the second port, and the third port,
- where the first multicast forwarding table and the second multicast forwarding table do not include routing information associated with the third port, and
- where the instructions further comprise:
  - one or more instruction to receive a fourth packet; and
  - one or more instruction to multicast the fourth packet to the plurality of destination nodes using a third multicast forwarding table that includes routing information associated with the first port and the fourth port and does not include routing information associated with the second port and the third port.

* * * * *